United States Patent
Tai

(10) Patent No.: US 6,273,978 B1
(45) Date of Patent: Aug. 14, 2001

(54) PROCESS FOR PRODUCING CARDED AND AIR-LAID NON-WOVEN COMPOSITE FABRIC

(75) Inventor: Jung Chi Tai, Tainan Hsien (TW)

(73) Assignee: Kang Na Hsiung Enterprise Co., LTD, Tainan District (TW)

( * ) Notice: Subject to any disclaimer, the term of this patent is extended or adjusted under 35 U.S.C. 154(b) by 0 days.

(21) Appl. No.: 09/770,715

(22) Filed: Jan. 25, 2001

(30) Foreign Application Priority Data

Oct. 2, 2000 (TW) .............................. 089120461

(51) Int. Cl.⁷ .............................. B32B 31/00; D04H 1/72
(52) U.S. Cl. ................... 156/62.8; 156/148; 19/145.7; 19/302; 264/112; 264/113
(58) Field of Search .................. 156/62.2–62.8, 156/148; 19/145.7, 296, 163, 302; 264/112, 113

(56) References Cited

U.S. PATENT DOCUMENTS

| 4,196,245 | 4/1980 | Kitson et al. | 428/198 |
| 4,287,251 | 9/1981 | King et al. | 428/198 |
| 4,904,439 | * 2/1990 | Farrington et al. | 264/510 |
| 4,985,279 | * 1/1991 | Mussallem, III | 427/209 |
| 5,413,849 | * 5/1995 | Austin et al. | 428/293 |
| 6,024,813 | * 2/2000 | Groeger et al. | 156/62.8 |

* cited by examiner

*Primary Examiner*—Sam Chuan Yao
(74) *Attorney, Agent, or Firm*—Darby & Darby

(57) ABSTRACT

The present invention provides a process for producing a carded and air-laid non-woven composite fabric. First, a fiber is subjected to carding treatment through a carding machine to form a carded web. Then, a fiber, powder, or particulate material is subjected to air-laying through an air-laying device to form an air-laid web. The sequence of carding and air-laying steps can be exchanged, and the carding machine and the air-laying device are disposed on the same production line. Finally, the above webs are consolidated into a non-woven composite fabric. In the present invention, since carding and air-laying are conducted on the same production line, the procedure for producing air-laid webs off-line can be omitted. Therefore, the thermoplastic polymer amount added to increase the web strength can be decreased, thus decreasing the production cost.

11 Claims, No Drawings

PROCESS FOR PRODUCING CARDED AND AIR-LAID NON-WOVEN COMPOSITE FABRIC

BACKGROUND OF THE INVENTION

1. Field of the Invention

The present invention relates to a process for producing a carded and air-laid non-woven composite fabric, and more particularly to a continuous process for producing a non-woven composite fabric in which carding and air-laying are conducted on the same production line.

2. Description of the Prior Art

Non-woven fabrics have been extensively used in household and medical applications. For example, such fabric has been used in such products as disposable diapers, sanitary napkins, and surgical clothes. Generally, a non-woven fabric is formed by consolidating multiple layers of different webs. For example, in U.S. Pat. No. 4,196,245, it is disclosed that a meltblown web is composited with other webs such as spunbonded web, wet-laid web, carded web, and air-laid web. In U.S. Pat. No. 4,287,251, it discloses an absorbent nonwoven fabric including an absorbent layer and a hydrophobic layer. The absorbent layer can be a rayon web, air-laid web, wet-laid web, or carded rayon web, and the hydrophobic web can be any web-like structural form having an open area.

As mentioned above, a non-woven composite fabric is generally formed by consolidating a multiple layers of webs by calender bonding. The manufacturer for manufacturing webs and that for manufacturing non-woven composite fabric is different. The web manufacturer only manufactures webs and it sells the webs to the non-woven composite fabric manufacturer. The non-woven composite fabric manufacturer buys various appropriate webs from the web manufacturer and then makes the multiple layers of webs consolidated into a non-woven composite fabric.

In recent years, the need for air-laid webs has been increasing. Generally, the main component of an air-laid web is pulp. In order to strengthen the web and for the reason of easy transportation, a considerable amount of thermoplastic polymer, such as thermoplastic PP/PE should be added. In the air-laid web, pulp, rather than thermoplastic PP/PE, is the component that provides absorption. Therefore, use of a large amount of thermoplastic PP/PE will increase the production cost.

SUMMARY OF THE INVENTION

Therefore, the object of the present invention is to provide a process for producing a carded and air-laid non-woven composite fabric. In this process, the procedure for producing air-laid webs on off-line can be omitted. Therefore, the thermoplastic polymer amount added for increasing the web strength can be decreased, thus decreasing the production cost.

To achieve the above object, the process for producing a carded and air-laid non-woven composite fabric of the present invention includes the following steps:

(a) subjecting a fiber to carding treatment through a carding machine to form a carded web;

(b) subjecting a fiber, powder, or particulate material to air-laying through an air-laying device to form an air-laid web; and (c) consolidating the above webs into a non-woven composite fabric, wherein the sequence of steps (a) and (b) can be exchanged, and the carding machine and the air-laying device are disposed on the same production line.

DETAILED DESCRIPTION OF THE INVENTION

According to the present invention, the fiber suitable for use in carding can be a mono-component fiber or bi-component fiber. When a mono-component fiber is used, this fiber is preferably made of polypropylene (PP), polyethylene (PE), polyethylene terephthalate (PET), polybutylene terephthalate (PBT), a copolymer of polypropylene (COPP), a copolymer of polyethylene terephthalate (COPET), a copolymer of polybutylene terephthalate (COPBT), or a polyamide. When a bi-component fiber is used, this fiber is preferably made of polypropylene/polyethylene (PP/PE), polyethylene terephthalate/polyethylene (PET/PE), polyethylene terephthalate/polypropylene (PET/PP), polypropylene/a copolymer of polypropylene (PP/COPP), polyethylene terephthalate/a copolymer of polyethylene terephthalate (PET/COPET), or a higher melting polyamide/a lower melting polyamide.

According to the present invention, the material suitable for use in air-laying can be fiber, powder, or particulate material, such as pulp, activated carbon fibers or powders, super absorbent polymer (SAP) fibers or powders, polymer fibers or powders, hot melt adhesive fibers or powders, water-absorbent fibers, particles, or powders, oil-absorbent fibers or powders, deodorant fibers or powders, or mixtures thereof.

A feature of the present invention is that carding and air-laying are conducted on the same production line. Therefore, it is necessary that at least one carding machine and at least one air-laying device be disposed on the same production line. Whether carding treatment or air-laying treatment is conducted first is not limited.

The consolidating method suitable for use in the present invention is not limited and can be calender bonding, hot air-through bonding, water-jet entangling, ultrasonic bonding, or high frequency wave bonding.

According to a preferred embodiment of the present invention, carding treatment can be first conducted, and air-laying treatment is then conducted. The procedures are as follows. First, a fiber is subjected to carding treatment through a first carding machine to form a first carded web. Then, a fiber, powder, or particulate material is subjected to air-laying through a first air-laying device to form a first air-laid web on the first carded web. Finally, the above webs are consolidated into a non-woven composite fabric. The first carding machine and the first air-laying device are disposed on the same production line.

In addition, in order to achieve some specific function, a polymer film, such as polyethylene film, can be laminated on the webs before the webs are consolidated according to requirements. The procedures are as follows. First, a fiber is subjected to carding treatment through a first carding machine to form a first carded web. Then, a fiber, powder, or particulate material is subjected to air-laying through a first air-laying device to form a first air-laid web on the first carded web. Then, a polymer film is laminated onto the first air-laid web. Finally, the above webs and the film are consolidated into a non-woven composite fabric. The first carding machine and the first air-laying device are disposed on the same production line.

In order to achieve some specific function, a resin or polymer can be coated onto the non-woven composite fabric. The coating layer is generally a non-air permeable film. Therefore, after coating, the coated non-woven composite fabric is preferably subjected to corona treatment. This will make the non-woven composite fabric become porous and has air permeability.

In the process of the present invention, more than one carding step and more than one air-laying step can be conducted. That is to say, the process of the present invention includes at least one carding step and at least one air-laying step. For example, a carded/air-laid/air-laid/carded non-woven composite fabric (abbreviated to CAAC non-woven composite fabric) can be produced according to the process of the present invention. The procedures are as follows. First, a fiber is subjected to carding treatment through a first carding machine to form a first carded web. Then, a fiber, powder, or particulate material is subjected to air-laying through a first air-laying device to form a first air-laid web on the first carded web. Then, a fiber, powder, or particulate material is subjected to air-laying through a second air-laying device to form a second air-laid web on the first air-laid web. Then, a fiber is subjected to carding treatment through a second carding machine to form a second carded web on the second air-laid web. Finally, the above webs are consolidated into a non-woven composite fabric. The first carding machine and the first air-laying device are disposed on the same production line. Preferably, the first carding machine, the second carding machine, the first air-laying device, and the second air-laying device are disposed on the same production line.

Also, a carded/air-laid/carded/carded non-woven composite fabric (abbreviated to CACC non-woven composite fabric) can be produced by the process of the present invention. The procedures are as follows. First, a fiber is subjected to carding treatment through a first carding machine to form a first carded web. Then, a fiber, powder, or particulate material is subjected to air-laying through a first air-laying device to form a first air-laid web on the first carded web. Then, a fiber is subjected to carding treatment through a second carding machine to form a second carded web on the first air-laid web. Then, a fiber is subjected to carding treatment through a third carding machine to form a third carded web on the second carded web. Finally, the above webs are consolidated into a non-woven composite fabric. The first carding machine and the first air-laying device are disposed on the same production line. Preferably, the first carding machine, the second carding machine, the third carding machine, and the first air-laying device are disposed on the same production line.

In the present invention, carding and air-laying are conducted on the same production line. Therefore, by means of the process for producing the carded and air-laid non-woven composite fabric of the present invention, the procedure for producing air-laid webs off-line can be omitted. Therefore, the thermoplastic polymer amount added for increasing the web strength can be decreased, thus decreasing the production cost.

The following examples are intended to illustrate the process and the advantages of the present invention more fully without limiting its scope, since numerous modifications and variations will be apparent to those skilled in the art.

EXAMPLE 1

PP/PE composite fiber (2d, 51 mm) was carded through a first carding machine to form a carded web having a basis weight of 10 g/m$^2$. The web then moved on to an air-laying device. Pulp and PP/PE composite fiber (2d, 5 mm) were mixed and air-laid through an air-laying device to form an air-laid web (62 g/m$^2$) (pulp: 42 g/m$^2$, composite fiber: 20 g/m$^2$), which was laid onto the carded web as the second layer. Then, the webs moved on to a second and third carding machine. Two carded webs made of PP/PE composite fiber (2d, 51 mm) (9 g/m$^2$) were laid onto the air-laid web as the third and fourth layer. The basis weight of the total four layers was 90 g/m$^2$. The four-layered laminate was calender bonded together to form a composite fabric. The properties are shown in Table 1.

TABLE 1

| Item | Average Value |
| --- | --- |
| Basis weight | 90.56 g/m$^2$ |
| Longitudinal tension | 3468.8 g/25 mm |
| Extension ratio | 20% |
| Transverse tension | 1033.0 g/25 mm |
| Extension ratio | 28% |
| Thickness | 3.12 mm |
| Water absorbency multiple | 32.2 |

EXAMPLE 2

PP/PE composite fiber (2d, 51 mm) was carded through a first carding machine to form a carded web having a basis weight of 15 g/m$^2$. The web then moved on to an air-laying device and was laid with an air-laid web (the second layer). This air-laid web included 21 g/m$^2$ of PP/PE composite fiber (2d, 5 mm), 86 g/m$^2$ of pulp, and 38 g/m$^2$ of water-absorbent powder. Then, the webs moved on to a second and third carding machine. Two carded webs made of PP/PE composite fiber (2d, 51 mm) (7.5 g/m$^2$) were laid onto the air-laid web as the third and fourth layer. The four-layered laminate was calender bonded together to form a composite fabric. The properties are shown in Table 2.

TABLE 2

| Item | Average Value |
| --- | --- |
| Basis weight | 175.9 g/m$^2$ |
| Longitudinal tension | 4271.3 g/25 mm |
| Extension ratio | 18% |
| Transverse tension | 1309.7 g/25 mm |
| Extension ratio | 27% |
| Thickness | 3.74 mm |
| Water absorbency multiple | 64.6 |
| Absorption amount | 150.1 g |
| Stiffness | 13.1 cm |
| Articifical menses | 2.46 g |

Note: Artificial menses are composed of distilled water, NaCl, $Na_2CO_3$, glycerol, and Na-CMC.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for producing a carded and air-laid non-woven composite fabric, comprising the following steps, in sequential order:
   (a) subjecting a fiber to a carding treatment through a first carding machine to form a first carded web;
   (b) subjecting a fiber, powder, or particulate material to air-laying through an air-laying device to form an air-laid web on the first carded web;

(c) subjecting a fiber to a carding treatment through a second carding machine to form a second carded web on the air-laid web;

(d) subjecting a fiber to a carding treatment through a third carding machine to form a third carded web on the second carded web; and (e) consolidating the above webs into a non-woven composite fabric, wherein the carding machine and the air-laying device are disposed on the same production line.

2. The process as claimed in claim 1, wherein the fiber is a mono-component fiber or bi-component fiber.

3. The process as claimed in claim 2, wherein the fiber is a mono-component fiber made of a polymer selected from the group consisting of polypropylene (PP), polyethylene (PE), polyethylene terephthalate (PET), polybutylene terephthalate (PBT), a copolymer of polypropylene (COPP), a copolymer of polyethylene terephthalate (COPET), a copolymer of polybutylene terephthalate (COPBT), and a polyamide.

4. The process as claimed in claim 2, wherein the fiber is a bi-component fiber made of a material selected from the group consisting of polypropylene/polyethylene (PP/PE), polyethylene terephthalate/polyethylene (PET/PE), polyethylene terephthalate/polypropylene (PET/PP), polypropylene/a copolymer of polypropylene (PP/COPP), polyethylene terephthalate/a copolymer of polyethylene terephthalate (PET/COPET), and a higher melting polyamide/a lower melting polyamide.

5. The process as claimed in claim 1, wherein the fiber, powder, or particulate material is selected from the group consisting of pulp, activated carbon fibers or powders, super absorbent polymer fibers or powders, polymer fibers or powders, hot-melt adhesive fibers or powders, water-absorbent fibers, particles, or powders, oil-absorbent fibers or powders, deodorant fibers or powders, and mixtures thereof.

6. The process as claimed in claim 5, wherein the fiber, powder, or particulate material includes pulp.

7. The process as claimed in claim 6, wherein the fiber, powder, or particulate material includes pulp and polymer fibers.

8. The process as claimed in claim 1, further comprising, after step (e), the following step:

coating a resin or polymer onto the non-woven composite fabric formed from step (e).

9. The process as claimed in claim 8, further comprising the following step:

subjecting the coated non-woven composite fabric to corona treatment.

10. The process as claimed in claim 1, wherein the first carding machine, the second carding machine, the third carding machine, and the air-laying device are disposed on the same production line.

11. The process as claimed in claim 1, further comprising after step (d), the step of laminating a polymer film onto the third carded web.

* * * * *